United States Patent [19]
Thoroughgood

[11] 3,728,405
[45] Apr. 17, 1973

[54] PROCESS FOR PREPARING POLYFLUOROPERHALO-CYCLOBUTENES

[75] Inventor: John Allan Thoroughgood, Newark, Del.

[73] Assignee: E. I. du Pont de Nemours and Company, Wilmington, Del.

[22] Filed: Sept. 14, 1970

[21] Appl. No.: 72,027

[52] U.S. Cl. .............. 260/648 F, 252/441, 252/442
[51] Int. Cl. ...................... C07c 17/00, C07c 23/06
[58] Field of Search ................................ 260/648 F

[56] References Cited

UNITED STATES PATENTS 3,355,507  11/1967  Pierce ........................... 260/648 F

*Primary Examiner*—Daniel D. Horwitz
*Attorney*—Francis J. Crowley

[57] ABSTRACT

An improved process for the preparation of polyfluoroperhalocyclobutenes by reacting hexachlorobutadiene with hydrogen fluoride at 300°–500° C. in the presence of a zinc fluoride catalyst.

6 Claims, 1 Drawing Figure

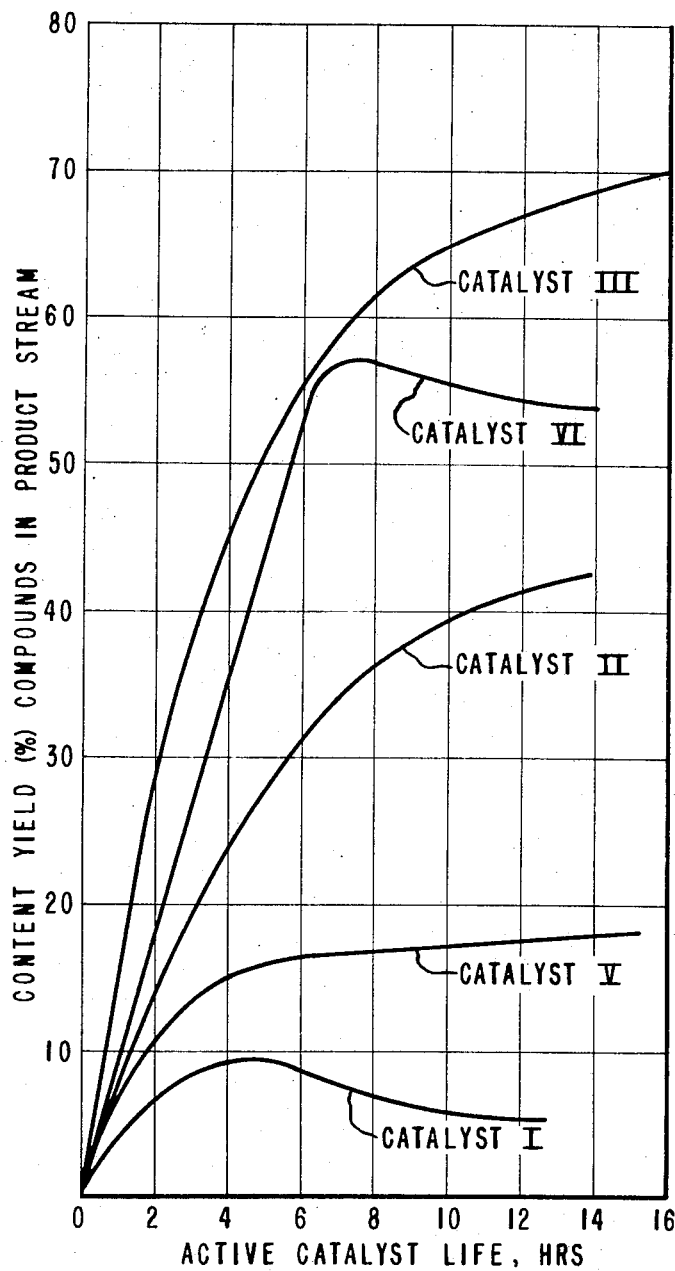

PROCESS FOR PREPARING POLYFLUOROPERHALOCYCLOBUTENES

BACKGROUND OF THE INVENTION

1. Field of the Invention

This invention relates to an improved process for preparing polyfluoroperhalocyclobutenes by reacting hexachlorobutadiene with hydrogen fluoride at 300°–500° C. in the presence of a catalyst selected from either zinc fluoride mixed with graphite or zinc fluoride on alumina prepared by fluorinating zinc chloride on an alumina support with hydrogen fluoride. The polyfluoroperhalocyclobutenes thus prepared are useful as solvents, as intermediates for the production of perfluoro succinic acid and as intermediates for the production of polyfluoroperhalocyclobutanes which are useful as refrigerants, solvents, and propellents.

2. Description of the Prior Art

Saturated fluorine-containing, four-membered ring compounds have generally been prepared by the cycloaddition reaction of 2 moles of fluoro-olefins. Structural requirement of fluoro-olefins which undergo cycloaddition reaction should be the presence of a terminal difluoromethylene group (cf "the Cycloaddition Reaction of Fluoro-olefins" by W. H. Sharkey in "Fluorine Chemistry Reviews," P. Tarrant, Editor, Marcel Dekker, Inc., N. Y. 1968). Fluoro-olefins such as tetrafluoroethylene, chlorotrifluoroethylene and 1,1-dichloro-2,2-difluoroethylene readily undergo cycloaddition reaction with themselves (often called dimerization reaction) to form octafluorocyclobutane, 1,2-dichlorohexafluorocyclobutane, and 1,1,2,2-tetrachlorotetrafluorocyclobutane, respectively. The cyclo-addition reaction of the fluoro-olefins is not limited to the reaction with the same fluoro-olefin but may react with other fluoro-olefins and other classes of unsaturated compounds. Thus tetrafluoroethylene can react with chlorotrifluoroethylene to form monochloroheptafluorocyclobutane or react with 1,1-dichloro-2,2-difluoroethylene to form 1,1-dichlorohexafluorocyclobutane or react with an olefin of the structure CH$_2$=CHX to form cyclobutane of the structure

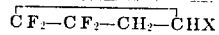

$\overline{CF_2-CF_2-CH_2-CHX}$ where X is alkyl, halogen, acetate, alkoxy, nitrile, carboalkoxy and others or react with acetylene and acetylene derivatives to form tetrafluorocyclobutene and derivatives of tetrafluorocyclobutenes.

While the preparation of fluorine-containing, four-membered ring compounds by the cycloaddition reaction is a useful procedure, there are a number of undesirable features which limit the use of said cycloaddition reaction for large scale economical preparation of fluorinated four-member ring compounds. First, the fluoro-olefins useful in the cycloaddition reaction should contain terminal difluoromethylene group. Fluoro-olefins containing terminal difluoromethylene groups are, however, costly to prepare. Tetrafluoroethylene, for example, is manufactured industrially by pyrolysis of chlorodifluoromethane. Chlorodifluormethane in turn is produced by the fluorination of chloroform with hydrogen fluoride. Tetrafluoroethylene may also be produced by dehalogenation of 1,2-dichlorotetrafluoroethane which in turn is produced by fluorination of hexachloroethane. Similarly, chlorotrifluoroethylene may be produced by dehalogenation of 1,1,2-trichlorotrifluoroethane which is also produced by fluorination of hexachloroethane.

Second, cycloadditon reactions of fluoro-olefins are carried out at fairly high temperatures, usually in the range of 400°–500° C. Since the fluoro-olefins can undergo polymerization, under the conditions used for the cycloadditon reaction, that of high temperature (and high pressure as well), a portion of the costly fluoro-olefin is lost by the formation of polymers.

Finally, many of the fluoro-olefins require extreme care in handling either to prevent uncontrolled polymerization or, as is particularly the case with tetrafluoroethylene, to prevent explosive decomposition.

Pierce, in U.S. Pat. No. 3,355,507, discloses preparation of 1,2-dichloro-3,3,4,4-tetrafluorocyclobutene in unstated yield by the reaction of hexachlorobutadiene and hydrogen fluoride at 200°–500° C. in the presence of a dry catalyst consisting essentially of aluminum oxide having dispersed on the surface thereof a halide of a promoter metal selected from the group consisting of metals of Group IB, VB, VIB, VIIB and VIII of the Periodic Table, said catalyst having been contacted before use with HF in the presence of water.

The above patent merely discloses that 1,2-dichloro-3,3,4,4-tetrafluorocyclobutene can be prepared by the reaction of hexachlorobutadiene with hydrogen fluoride in the presence of aluminum oxide promoted with certain metal halides. There is no indication of the yield of 1,2-dichloro-3,3,4,4-tetrafluorocyclobutene obtainable by the process of this patent. There is likewise no indication that any other fluorine-containing, four-membered rings are obtained; of the useful life of the catalyst; or that any other metal halide outside of those in Groups IB, VB, VIB, VIIB and VIII are useful.

An improved process has now been discovered whereby hexachlorobutadiene is reacted with hydrogen fluoride in the presence of a zinc fluoride catalyst selected from zinc fluoride mixed with graphite and zinc fluoride on alumina prepared by fluorinating zinc chloride on an alumina support with hydrogen fluoride. The catalysts utilized in this process extended active catalyst life and effected a good yield of the desired polyfluoroperhalocyclobutene products.

SUMMARY OF THE INVENTION

The present invention is an improved process for preparing polyfluoroperhalocyclobutenes by reacting hexachlorobutadiene with hydrogen fluoride at a temperature of from about 300° C. to about 500° C. and at a contact time of from about 3.5 to about 21 seconds, in the presence of a zinc fluoride catalyst. The zinc fluoride catalyst is selected from either zinc fluoride mixed with graphite or zinc fluoride on alumina. When zinc fluoride on alumina is used, it is prepared by contacting zinc chloride on alumina with hydrogen fluoride.

DESCRIPTION OF THE DRAWING

The graphic FIGURE shows the relationship between the content (Yield percent) of fluorine-containing, four-member ring compounds present in the product stream and the active catalyst time for various catalysts discussed herein.

DESCRIPTION OF THE INVENTION

Present invention is an improved process for preparing polyfluoroperhalocyclobutenes by reacting hexachlorobutadiene with anhydrous hydrogen fluoride in the presence of a catalyst selected from the group consisting of zinc fluoride mixed with graphite and zinc fluoride on alumina prepared by fluorinating zinc chloride on alumina with hydrogen fluoride, said reaction taking place in the temperature range of about 300° to 500° C. and with a contact time of about 5 to 30 seconds. This is called a fluorination-cyclization of hexachlorobutadiene.

By polyfluoroperhalocyclobutene, as used herein, is meant a perhalocyclobutene containing at least three fluorine atoms and wherein all of the halogen is fluorine or chlorine. This includes, for example, 1,2-dichloro-3,3,4,4-tetrafluorocyclobutene, 1-chloro-2,3,3,4,4-pentafluorocyclobutene, 1,2,3-trichloro-3,4,4-trifluorocyclobutene and 1,2,3,3,4,4-hexafluorocyclobutene.

By hexachlorobutadiene, as used herein, is meant 1,1,2,3,4,4-hexachlorobutadiene-1,3.

By fluorination-cyclization of hexachlorobutadiene is meant a reaction whereby hexachlorobutadiene is reacted with hydrogen fluoride in the presence of a catalyst such that the reaction products obtained are a fluorine-containing, four-member ring compounds. It is not known whether the fluorination and the cyclization occur sequentially or simultaneously. However, since the fluorination of hexachlorobutadiene with hydrogen fluoride is reported to give $CF_3Cl = ClCF_3$ and $CF_3Cl = CFCF_3$ which compounds do not form four-member ring compounds on heating and since hexachlorobutadiene does not form four-member ring compounds (Probes and Miller J. Am. Chem. Soc., 71 598 (1949)) when heated, it is assumed that the fluorination and cyclization occur simultaneously.

Either zinc fluoride mixed with graphite or zinc fluoride on alumina prepared by fluorinating zinc chloride on alumina with hydrogen fluoride may be utilized as a catalyst in the process of the present invention. Thus, the presence of basic aluminum fluoride or alumina is not required. It has, however, been found that when hexachlorobutadiene is reacted with hydrogen fluoride at 400°–450° C. in the presence of zinc fluoride prepared by fluorinating zinc chloride in the presence of alumina, conversion of about 91–95 percent of hexachlorobutadiene is obtained with the yield of fluorine-containing, four-member ring compounds of about 70 to 75 percent and consequently this catalyst is preferred.

The fluorination-cyclization catalytic activity of zinc fluoride in the process of the present invention is unexpected, particularly since cadmium fluoride which is a halide of a metal in the same Group IIB of the periodic table as zinc does not appear to exhibit any corresponding activity.

The exact nature of the active zinc fluoride catalyst is not known. The activity appears to depend upon the method of preparation and upon the nature of the catalyst support. For example, zinc fluoride prepared by fluorinating zinc chloride on alumina is a very active catalyst while zinc fluoride on alumina treated with hydrogen fluoride is a very poor catalyst rendering it uneconomical and impractical to use. However, when zinc fluoride is pelletized with graphite and then treated with hydrogen fluoride, zinc fluoride catalyst of satisfactory activity is obtained. When cadmium fluoride is pelletized with carbon and then treated with hydrogen fluoride, such cadmium fluoride is a very poor catalyst. The activity of cadmium fluoride is increased slightly when cadmium fluoride on alumina is treated with hydrogen fluoride. Cobalt fluoride prepared by fluorinating cobalt chloride on alumina gives a catalyst which is slightly better than zinc fluoride pelletized with graphite but it has a shorter active catalyst life than zinc fluoride. The following table summarizes the activity of the catalysts prepared in different ways and on different supports. In all cases, wherein the support is alumina, the same alumina, F-110, from Alcoa was used.

TABLE I

| | No. of runs | temp. range °C. | conversion % | Cyclics Yield % | Cyclics in prod. Stream Mole % |
|---|---|---|---|---|---|
| 1. $ZnF_2$ on Alumina | 4 | 375–430 | 45.6 | 17.9 | 7.4 |
| 2. $ZnF_2$-Graphite | 4 | 400–500 | 64.6 | 56.9 | 35.6 |
| 3. $ZnF_2$ from $ZnCl_2$ on Alumina | 5 | 400–500 | 89.6 | 77.7 | 68.3 |
| 4. $CdF_2$-Graphite | 2 | 400 | 8.0 | 21.9 | 1.8 |
| 5. $CdF_2$ on Alumina | 3 | 400 | 32.4 | 49.4 | 16.1 |
| 6. $CoF_2$ from $CoCl_2$ on Alumina | 3 | 400 | 69.6 | 69.3 | 49.4 |
| 7. Alumina Fluorinated | 3 | 400 | 64.9 | 43.5 | 32.2 |

The conversion of hexachlorobutadiene and the yield of fluorine-containing, four-member ring compounds in the above table represent average values for the reactions of 2–6 hours duration.

The preparation of these catalysts and their effectiveness will be discussed at length in the examples; however, briefly, the table sets out several things: (1) zinc fluoride mixed with graphite and zinc fluoride prepared by fluorinating zinc chloride-on-alumina are effective fluorination-cyclization catalysts, the latter is exceptionally so; (2) cadmium fluoride which is a fluoride of a metal in the same Group IIB as zinc, has little activity; (3) fluorination-cyclization of hexachlorobutadiene does not require alumina or fluorination of products of alumina; and (4) cobalt fluoride prepared by fluorination of cobalt chloride-on-alumina is of lower activity than zinc fluoride prepared by fluorination of zinc chloride-on-alumina, but as will be seen in the drawing and discussed hereinafter, its active catalyst life is very much shorter than those of the zinc fluoride catalysts used in this invention.

In general any of the many available activated aluminas may be employed in the preparation of the preferred catalyst of this invention. Activated alumina is usually characterized by its relatively high surface area (10–400 sq. meters/gm.). It has been found convenient to use the alumina supplied as balls, i.e., of ⅛–¼ inch diameter which are commonly sold as descant or drying agents for liquids and gases and as catalyst carrier. A particularly useful form of alumina is that sold by Kaiser Chemicals as "Active Alumina KA- 201" which has a typical chemical analyses of $SiO_2$ 0.02%; $F_2O_3$ 0.02%; $TiO_2$ 0.002%; $Na_2O$ 0.30%; loss on ignition of 6.0% and $Al_2O_3$ content of 93.6%. Typical physical properties of the above alumina are surface area of 380 sq. meters per gram, pore volume of 0.51 cc. per gram, pore diameter 50A. and bulk density of 47–48 lb. per cu. ft.

With most of the aluminas, a problem is usually experienced during the fluorination of the catalyst. If an attempt is made to fluorinate the catalyst adsorbed on alumina in a reactor with hydrogen fluoride at elevated temperatures, reactor plugging is often encountered. It is believed that the reactor plugging occurs during the fluorination process because considerable amount of water is evolved during fluorination and that this evolved water forms a paste with the metal halide and alumina, which paste upon further dehydration forms a solid plug. Usually, in order to avoid plugging of the reactor, the fluorination of the catalyst is carried out in a separate vessel equipped with rotating drum lined with such inert material such as poly(tetrafluoroethylene). After the catalyst has been sufficiently fluorinated, such catalyst may then be used in a reactor without further difficulty of plugging. However, it has been found that a catalyst prepared by using the above-described KA-201 alumina may be fluorinated in a reactor without any occurrence of plugging.

The zinc fluoride mixed with graphite catalyst used in the process of this invention may be prepared by mixing dried zinc fluoride powder and graphite and adding the mixture to a pelletizer to form zinc fluoride-graphite pellets. These pellets are then treated with anhydrous hydrogen fluoride at 400° C. until water is no longer detectable in the effluent gas stream.

The more preferred catalyst utilized in this invention is prepared by soaking porous alumina balls in a solution of zinc chloride prepared by dissolving zinc chloride in 6N hydrochloric acid. The alumina is then separated from the aqueous solution and partially dried. This treated alumina is then further treated with anhydrous hydrogen fluoride at 400° C. until water is no longer detectable in the effluent gas stream.

In carrying out the fluorination-cyclization of hexachlorobutadiene according to the present invention using the catalysts of the invention, hexachlorobutadiene is mixed with gaseous hydrogen fluoride and passed through a bed of the catalyst at 300°–500° C. The product may be scrubbed with water or with an aqueous alkaline solution to remove hydrogen chloride and hydrogen fluoride, the organic phase is then separated from the aqueous phase, dried by contacting with solid dehydration agent such as anhydrous $CaSO_4$, $MgSO_4$, $CaCl_2$ and then distilled to recover polyfluoroperhalocyclobutenes or the product may be condensed and polyfluoroperhalocyclobutene recovered by fractional distillation processes known in the art. The distillation may be carried out at atmospheric pressure but is preferably carried out under pressure.

The product stream from the fluorination-cyclization of hexachlorobutadiene contains fluorine-containing, four-member ring compounds which include 1,2-dichloro-3,3,4,4-tetrafluorocyclobutene, 1,2,3-trichloro-3,4,4-trifluorocyclobutene, 1-chloro-2,3,3,4,4-pentafluorocyclobutene and 1,2,3,3,4,4-hexafluorocyclobutene, recycleable products, i.e., products which may be subjected to further fluorination-cyclization reactor to form fluorine-containing, four-member ring compounds, which include 1,1-difluoro-2,3,4,4-tetrachlorobutadiene-1,3, 1-fluoro-1,2,3,4,4-pentachlorobutadiene-1,3 and unreacted hexachlorobutadiene and some nonrecycleable products, i.e., products which do not form fluorine-containing, four-member ring compounds when subjected to the fluorination-cyclization reaction, e.g., 1,1,1,2,4,4,4-heptafluorobutene-2,1,1,1,4,4,4-hexafluorobutene-2, 1,1,1,2,4,4,4-heptafluorobutane, 1-chlorobutane as well as some cleavage products, pentafluoroethane, methyl fluoride and hydrogen chloride and hydrogen fluoride.

The process of the present invention is carried out in the temperature range of about 300° to 500° C. At temperatures below about 300° C. both the yield of the fluorine-containing, four-member ring compounds and the conversion of hexachlorobutadiene are so low as to make the operation of the process uneconomical. Temperatures above about 500° C. are not desirable since the yield of fluorine-containing, four-member ring compounds decrease and the proportion of nonrecycleable products as well as the cleavage products greatly increases. The preferred temperature range for the fluorination-cyclization of hexachlorobutadiene is from about 375° C. to about 425° C.

The stoichiometry of the reaction between hexachlorobutadiene and hydrogen fluoride to produce 1,2-dichloro-3,3,4,4-tetrafluorocyclobutene requires four moles of hydrogen fluoride per mole of hexachlorobutadiene. To produce perfluorinated four-member ring compounds, i.e., 1,2,3,3,4,4-hexafluorocyclobutene, six moles of hydrogen fluoride per mole of hexachlorobutadiene are required. Generally the process of this invention is carried out by using an excess of hydrogen fluoride. Use of from about 10 to 12 moles of hydrogen fluoride per mole of hexachlorobutadiene is preferred. It has been found experimentally that by increasing the molar ratio of hydrogen fluoride to hexachlorobutadiene above the 10–12 range, no further increase in the yield of fluorine-containing, four-member ring compound nor in the conversion of hexachlorobutadiene takes place. While excessive amounts of hydrogen fluoride has no deleterious effect on the conversion or the yield, excessive hydrogen fluoride is to be avoided since the presence of a large excess of hydrogen fluoride in the product stream can complicate recovery of the desired products and additionally entails greater expense for the recovery of the excess hydrogen fluoride. The hydrogen fluoride used is preferably anhydrous but hydrogen fluoride containing a few percent of water may also be used without any noticeable effect.

The fluorination-cyclization reaction of hexachlorobutadiene is usually carried out at pressures slightly above atmospheric but both sub-atmospheric and super-atmospheric pressures may be used as well.

Contact times of from about 3.5 to about 21 seconds have been used successfully in the process of this invention. Generally contact times of less than about 2.5 seconds are undesirable because both the conversion of hexachlorobutadiene and the yield of fluorine-containing, four-member ring compounds are too low to be economically attractive. Contact times of greater than about 21 seconds are also undesirable since such contact times lead to the production of greater amounts of nonrecycleable products and cleavage products. Contact times of about 5 to about 15 seconds are preferred with the contact time of about 8 to about 12 seconds being most preferred.

Fluorination-cyclization of hexachlorobutadiene in the process of this invention has been carried out at the feed rate of hexachlorobutadiene such that the weight ratio of hexachlorobutadiene to catalyst was in the range of 0.03 to 0.53 per hour. Hexachlorobutadiene feed rates of 0.03 to 0.10 per unit of catalyst weight per hour are preferred with the feed rates of 0.03 to 0.05 being most preferred. Feed rate lower than about 0.03 may reduce the capacity of the reactor unit unnecessarily while the feed rate greater than about 0.10 may result in lower conversion and yield.

The effectiveness of any catalyst must be measured in terms of the yield of desired products obtained, the conversion of the reactant and the catalyst life. A catalyst which quickly loses activity and consequently has to be regenerated often is not a desirable catalyst. It has been found that the zinc fluoride catalysts of the present invention used in the fluorination-cyclization of hexachlorobutadiene are not only effective catalysts in terms of high conversion of hexachlorobutadiene and the high yields of fluorine-containing, four-member ring compounds but they also unexpectedly maintain high catalytic activity for extended periods of time.

The accompanying Figure shows the relationship between the content of fluorine-containing, four-member ring compounds in the product stream with active time for some of the catalysts of foregoing Table I. Catalysts I and V are of low activity and either stay the same in activity (V) or decrease after reaching maximum activity in 4-5 hours. Catalyst II increases in activity with time and appears to reach maximum activity at around 12-14 hours after the start of fluorination-cyclization reaction when the content of cyclic compounds in the products is about 42-43 percent. Catalyst VI rapidly reaches the maximum activity in 6-7 hours at content of 67-68 percent of cyclic compounds and thereafter steadily decreases in activity. The preferred catalyst of this invention, Catalyst III, also rapidly increases in activity but in contrast to the Catalyst VI, continues to increase in activity until the maximum activity is reached at some 35-37 hours at the cyclic compound content of around 75 percent. In some of the runs as much as 5 lbs. of hexachlorobutadiene per lb. of the catalyst was reacted, which at the rate of 0.04 lb. of hexachlorobutadiene per lb. of catalyst per hour, is 125 hrs. of operation without appreciable decrease in catalyst activity.

In the preferred embodiment of this invention a vapor mixture of hexachlorobutadiene and hydrogen fluoride wherein the molar ratio of hydrogen fluoride to hexachlorobutadiene is about 10 is contacted with a catalyst prepared by fluorinating zinc chloride on alumina with hydrogen fluoride and wherein the zinc metal content is in the range of about 0.5 to 10 percent, at about 375°-425° C. with the contact time of about 8 to 12 seconds to produce fluorine, containing, four-member ring compounds.

EXAMPLES

The following examples are intended to be merely illustrative of the invention and not in limitation thereof. Unless otherwise indicated, all quantities are by weight.

EXAMPLE 1 – PREPARATION OF CATALYSTS

Catalyst I – $ZnF_2$ on Alumina

To a saturated solution of zinc fluoride in boiling water containing 150 g. of zinc fluoride, were added 421 g. of F-110 alumina (Alcoa) balls of 0.3 cm diameter (⅛ inch) and allowed to soak overnight. After filtration, the alumina was partially dried by heating at about 150° C. in a vacuum oven overnight. The partially dried alumina was then placed in a rotatable drum lined with poly(tetrafluoroethylene). The drum was rotated and gradually heated to 200° C. while anhydrous hydrogen fluoride was passed into the drum at the rate of 0.3 to 0.4 mole/hr. Hydrogen fluoride addition was continued for about 6–7 hours. The resultant fluorinated catalyst was then usable in the fluorination-cyclization reactor without any problem due to plugging.

Catalyst II – $ZnF_2$ – Graphite

To 100 g. of dried zinc fluoride powder, was added 2 g. of graphite and the components were thoroughly mixed. The mixture was then added to a pelletizer whereby zinc fluoride-graphite pellets of approximately 0.6 cm diameter (¼ inch) were prepared. The zinc fluoride-graphite pellets were placed in a reactor used in the fluorination-cyclization reaction, which is more fully described in Examples 2–5 below, and slowly heated to 400° C. while anhydrous hydrogen fluoride was passed through the reactor at the rate of approximately 0.3 to 0.4 mole per hour.

Catalyst III – $ZnF_2$ from $ZnCl_2$ on Alumina

To a solution prepared by dissolving 291 g. of zinc chloride in 2130 ml. of 6N hydrochloric acid, were added 952 g. of F-110 alumina balls of approximately 0.3 cm diameter (⅛ inch) (Alcoa) and allowed to soak overnight. After filtering, the alumina was dried overnight in a vacuum oven at 150° C. Typically, the alumina after drying as above contained approximately 2.5 wt. percent of zinc as zinc metal. The above-dried alumina was placed in a rotatable drum. The drum was rotated while being heated to 200° C. and anhydrous hydrogen fluoride at a rate of about 0.4 mole per hour was passed into the drum for 6–7 hours. The zinc fluoride-on-alumina prepared as above can be used in the fluorination-cyclization reaction without any problem due to plugging. As mentioned earlier, when KA-201 alumina balls (Kaiser Chemical) are used instead of the F-110 alumina balls, the catalyst may be fluorinated in the fluorination-cyclization reactor directly without prior treatment in a rotating drum and without any problem due to plugging. Zinc chloride-on-alumina, wherein the weight of zinc as zinc metal of about 10 percent, was prepared by using higher concentration of zinc chloride in hydrochloric acid and was fluorinated and used successfully in fluorination-cyclization reaction.

Catalyst IV – $CdF_2$ – Graphite

To 100 g. of dried cadmium fluoride powder, 2 g. of graphite were added and the components mixed thoroughly. The mixture was then added to a pelletizer whereby cadmium fluoride-graphite pellets of approximately 0.6 cm. diameter (¼ inch) were prepared. The cadmium fluoride-graphite pellets were placed in a reactor used in the fluorination-cyclization reaction, which is more fully described in Examples 2-5 below, and slowly heated to 400° C. while anhydrous hydrogen fluoride was passed through the reactor at the rate of approximately 0.3 to 0.4 mole per hour.

Catalyst V – $CdF_2$ on Alumina

A solution was prepared by dissolving 128.6 g. of cadmium fluoride in 4670 ml. of water, and to this solution were added 421 g. of F-110 alumina balls of approximately 0.3 cm. (⅛ inch) diameter (Alcoa) and allowed to soak overnight. After filtration and partial drying by heating at 150° C. in a vacuum oven overnight, the material was placed in a rotatable drum lines with poly(tetrafluoroethylene), the drum was rotated and heated to 200° C. while anhydrous hydrogen fluoride was passed into the drum at the rate of approximately 0.3 to 0.4 mole per hour for 6-7 hours.

Catalyst VI – $CoF_2$ from $CoCl_2$ on Alumina

To a solution of 148 g. of $CoCl_2 \cdot 6H_2O$ in 312 ml. of 6N hydrochloric acid, were added 528 g. of F-110 alumina balls of approximately 0.3 cm diameter (⅛ inch) and the alumina was allowed to soak overnight. After filtration the material was dried at 150° C. in a vacuum oven overnight. The partially dried material was then placed in a rotatable drum. The drum was rotated and heated to 200° C. while anhydrous hydrogen fluoride was passed into the drum at the rate of 0.4 mole per hour for 7 hours.

Catalyst VII – Alumina Fluorinated

To 710 ml. of 6N hydrochloric acid, were added 635 g. of F-110 alumina balls of approximately 0.3 cm. diameter (⅛ inch) and allowed to soak overnight. After filtration the material was dried overnight in a vacuum oven at 150° C. The partially dried alumina was then placed in a rotatable drum. The drum was rotated and heated to 200° C. while anhydrous hydrogen fluoride was passed into the drum at the rate of 0.4 mole per hour for 7 hours.

EXAMPLES 2-5

The fluorination-cyclization reactor used was a vertically placed 2.5 cm (1 inch) diameter, 89 cm. (35 inches) long stainless steel pipe. The middle 50 cm. (20 inches) of the pipe, which contained the catalyst, was equipped with an electrical heater. In operation, the desired weight of the catalyst was placed in the heatable portion of the pipe. The reactor was heated to the desired temperature while a stream of anhydrous hydrogen fluoride was passed through the catalyst bed. When the catalyst bed had reached the desired temperature, the flow of hydrogen fluoride was adjusted and the hexachlorobutadiene was added to the hydrogen fluoride stream by means of a pump such that the desired ratio of hydrogen fluoride to hexachlorobutadiene was obtained. The reactants were added to the top of the vertical reactor and the product stream was removed from the bottom of the reactor. The reaction product steam was scrubbed in a 20 percent aqueous KOH solution, dried by passage through a tube containing drying agent such as anhydrous $CaCl_2$ or $CaSO_4$ and then condensed in a receiver immersed in a solid carbon dioxide-acetone bath (−78° C.). After the termination of a run, the KOH scrubbing solution was neutralized and extracted with ether to recover any hexachlorobutadiene which collected there. The condensed product stream was analyzed in a gas-liquid chromatograph equipped with a 6 meter column of DC-200 silicone packing. The gas chromatograph was used in conjunction with a time-of-flight mass spectrometer for further identification of the products.

Since many of the fluorine-containing olefins are toxic materials, extreme care must be used in handling products containing these fluoroolefins. In all examples the conversion refers to the conversion of hexachlorobutadiene and is determined in the usual way, i.e., % conversion = (moles HCBD fed − moles HCBD recovered × 100)/(moles HCBD fed)

where HCBD is hexachlorobutadiene. The yield of the products is given by

% yield = (moles of product obtained)/(moles of HCBD converted) × 100

In all cases the conversions and the yields were determined for the total duration of the runs and thus these figures represent average values from the start of the reaction to the termination of the runs.

The following tabulations show the results of the fluorination-cyclization of hexachlorobutadiene using Catalyst I which is not a catalyst of this invention. With Catalyst I as the following tabulation shows the conversions of hexachlorobutadiene of about 50 percent and yields of cyclic compounds of less than 20 percent were obtained. The majority of recycleable products were unreacted hexachlorobutadiene and from about 20 to about 40 percent of the product steam constituted non-recycleable products.

CATALYST I

| Example No. | 2 | 3 | 4 | 5 |
|---|---|---|---|---|
| Run No. | 21Fa | 21Fb | 22F | 23F |
| Temperature °C. | 375 | 375 | 350 | 430 |
| Contact Time, sec. | 13.1 | 15.9 | 8.2 | 12.0 |
| Catalyst wt.% | 122 | 122 | 122 | 122 |
| HCBD, Mole/hr. | 0.055 | 0.055 | 0.055 | 0.055 |
| HF, Mole/hr. | 0.55 | 0.45 | 0.60 | 0.55 |
| Duration of Run, Hrs. | 1.5 | 2.5 | 2.75 | 3.0 |
| Conversion, % | 42.0 | 51.5 | 49.8 | 39.7 |
| Yield of Cyclic Products, % | 22.8 | 17.9 | 13.2 | 12.9 |
| Products Obtained | | | | |
| Cyclic Prod. Mole % | 9.6 | 9.2 | 6.6 | 5.1 |
| $CF_2—CF_2—CCL=CCL$ | 4.2 | 3.6 | 1.0 | 0.4 |
| $CF_2—CFCL—CCL=CCL$ | 2.8 | 2.3 | 0.5 | 4.7 |
| $CF_2—CF_2—CF=CCL$ | 2.6 | 3.3 | 5.1 | |
| $CF_2—CF_2—CF=CF$ | | | | |
| Recycleable Prod., Mole % | | | | |
| $CF_2=CCL—CCL=CCL_2$ | 69.5 | 58.1 | 53.8 | 68.0 |
| $CFCL=CCL—CCL=CCL_2$ | 11.5 | 9.6 | 3.6 | 6.2 |
| $CCL_2=CCL—CCL=CCL_2$ | 58.0 | 48.5 | 50.2 | 61.3 |
| Non-Recycleable Products Mole % | | | | |
| $CF_3—CH=CF—CF_3$ | 21.0 | 32.5 | 39.6 | 27.0 |
| $CF_3—CH=CCL—CF_3$ | 20.1 | 29.9 | 18.2 | 12.5 |
| $CF_3—CCL=CCL—CF_3$ | 0.1 | 0.2 | 16.0 | 6.0 |
| $CF_3—CH=CH—CF_3$ | 0.7 | 1.3 | 1.2 | 1.0 |
| $CF_3—CHF—CH_2—CF_3$ | | | 4.0 | 6.2 |
| $CH_2CL—CH_2—CH_2—CH_3$ | | | | |
| Others | 0.1 | 1.1 | 0.2 | 1.3 |

EXAMPLES 6-9

Results of fluorination-cyclization of hexachlorobutadiene using Catalyst II are tabulated below. The reactions were carried out at described in Examples 2–5 above. These examples show that Catalyst II which is a catalyst of this invention, was a good catalyst giving conversions of greater than 50 percent and the yields of cyclic compounds of greater than 50 percent. These examples also show that most of the non-cyclic compounds in the product stream were recyclable products and that only about 10 percent of the materials in the product stream was non-recycleable.

CATALYST II

| Example No. | 6 | 7 | 8 | 9 |
|---|---|---|---|---|
| Run No. | 24F | 25F | 26F | 27F |
| Temperature °C. | 400 | 400 | 450 | 450 |
| Contact Time, Sec. | 6.2 | 6.2 | 5.8 | 5.8 |
| Catalyst Wt. g. | 151.5 | 151.5 | 151.5 | 151.5 |
| HCBD, Mole/Hr. | 0.055 | 0.055 | 0.055 | 0.055 |
| HF, Mole/Hr. | 0.55 | 0.55 | 0.55 | 0.55 |
| Duration of Run, Hr. | 4.0 | 3.5 | 2.75 | 3.0 |
| Conversion, % | 52.6 | 51.6 | 71.7 | 77.5 |
| Yield of Cyclic Products, % | 59.8 | 56.6 | 57.2 | 54.0 |
| Products Obtained Cyclic Prod. Mole % | 31.5 | 29.2 | 41.0 | 41.9 |
| $CF_2$—$CF_2$—$CCL$=$CCL$ | 4.6 | 4.4 | 9.4 | 10.4 |
| $CF_2$—$CFCL$—$CCL$=$CCL$ | 26.9 | 23.5 | 31.6 | 31.5 |
| $CF_2$—$CF_2$—$CF$=$CCL$ | | 1.3 | | |
| $CF_2$—$CF_2$—$CF$=$CF$ | | | | |
| Recycleable Prod., Mole % | 59.3 | 60.7 | 48.9 | 46.5 |
| $CF_2$=$CCL$—$CCL$=$CCL_2$ | 4.0 | 3.6 | 5.6 | 5.8 |
| $CFCL$—$CCL$—$CCL$=$CCL_2$ | 7.9 | 8.7 | 14.0 | 18.2 |
| $CCL_2$=$CCL$—$CCL$—$CCL_2$ | 47.4 | 48.4 | 29.3 | 22.5 |
| Non-Recycleable Prod. Mole % | 9.2 | 10.3 | 10.0 | 11.5 |
| $CF_3$—$CH$—$CF$—$CF_3$ | 7.6 | 8.9 | 5.8 | 9.7 |
| $CF_3$—$CH$=$CCL$—$CF_3$ | | | | |
| $CF_3$—$CCL$=$CCL$—$CF_3$ | | | | |
| $CF_3$—$CH$=$CH$—$CF_3$ | | | | |
| $CF_3$—$CHF$—$CH_2$—$CF_3$ | | | | |
| $CH_2CL$—$CH_2$-$CH_2$—$CH_3$ | | | | |
| Others | 1.6 | 1.4 | 4.2 | 1.8 |

EXAMPLES 10–14

Results of fluorination-cyclization of hexachlorobutadiene using Catalyst III, the preferred catalyst of this invention, are tabulated below. The reactions were carried out as described in Examples 2–5 above. Examples 10 and 11 represent the preferred conditions of this invention wherein the temperature of the reaction is about 400° C., the molar ratio of hydrogen fluoride to hexachlorobutadiene is about 10 and the contact time is about 10 seconds. It can be seen that by using the preferred catalyst and the preferred conditions the conversions of hexachlorobutadiene of greater than 90 percent were obtained and the yields of desired cyclic compounds obtained were about 80 percent and moreover, the amount of non-recycleable products in the product stream constituted less than 10 percent. Example 14 also demonstrates that excessively high reaction temperatures are not desirable since not only was the yield of the desired cyclic products decreased but the amount of non-recycleable products in the product stream was increased considerably.

CATALYST III

| Example No. | 10 | 11 | 12 | 13 | 14 |
|---|---|---|---|---|---|
| Run No. | 16F | 17F | 18F | 19F | 13F |
| Temperature °C. | 400 | 400 | 450 | 450 | 500 |
| Contact Time, Sec. | 10.7 | 10.7 | 9.9 | 9.9 | 10.0 |
| Catalyst Wt. g. | 245.6 | 245.6 | 245.6 | 245.6 | 227 |
| HCBD, Mole/Hr. | 0.055 | 0.055 | 0.055 | 0.055 | 0.055 |
| HF, Mole/Hr. | 0.55 | 0.55 | 0.55 | 0.55 | 0.55 |
| Duration of Run, Hr. | 1.3 | 3.2 | 4.8 | 4.6 | 3.0 |
| Conversion, % | 92.0 | 91.3 | 95.0 | 92.1 | 84.2 |
| Yield of Cyclic Prod., % | 80.0 | 81.1 | 76.0 | 76.4 | 74.2 |
| Products Obtained Cyclic Prod. Mole % | 73.6 | 74.1 | 72.2 | 70.4 | 62.5 |
| $CF_2$—$CF_2$—$CCL$=$CCL$ | 50.1 | 52.4 | 53.0 | 51.0 | 24.5 |
| $CF_2$—$CFCL$—$CCL$=$CCL$ | | 2.0 | 1.6 | 2.0 | 0.9 |
| $CF_2$—$CF_2$—$CF$=$CCL$ | 1.6 | 0.4 | | | |
| $CF_2$—$CF_2$—$CF$=$CF$ | 21.9 | 19.3 | 17.6 | 17.4 | 37.1 |
| Recycleable Prod., Mole % | 17.8 | 19.1 | 20.0 | 21.2 | 18.9 |
| $CF_2$=$CCL$—$CCL$—$CCL_2$ | 1.2 | 1.1 | 2.8 | 2.4 | 0.6 |
| $CFCL$=$CCL$—$CCL$=$CCL_2$ | 8.6 | 9.3 | 12.2 | 10.9 | 2.5 |
| $CCL_2$=$CCL$—$CCL$=$CCL_2$ | 8.0 | 8.7 | 5.0 | 7.9 | 15.8 |
| Non-Recycleable Prod., Mole % | 8.5 | 7.3 | 8.3 | 8.1 | 20.6 |
| $CF_3$—$CH$—$CF$—$CF_3$ | 0.8 | 0.6 | 1.0 | 0.9 | 2.5 |
| $CF_3$—$CH$=$CCL$—$CF_3$ | 5.0 | 3.0 | 6.1 | 4.2 | 13.6 |
| $CF_3$—$CCL$=$CCL$=$CF_3$ | 0.1 | | 0.5 | | |
| $CF_3$—$CH$=$CH$—$CF_3$ | | | | | |
| $CF_3$—$CHF$—$CH_2$—$CF_3$ | | | | | |
| $CH_2CL$—$CH_2$—$CH_2$—$CH_3$ | | | | | |
| Others | 2.6 | 3.7 | 0.7 | 3.0 | 2.5 |

EXAMPLES 15–16

Results of fluorination-cyclization of hexachlorobutadiene using Catalyst IV which is not a catalyst of this invention are tabulated below. The reactions were carried out as described in Examples 2–5 above. These examples show that with Catalyst IV both the conversions of hexachlorobutadiene and the yields of cyclic products are extremely low. Since $CdF_2$ is a fluoride of a metal in the same Group IIB in the periodic table as zinc, the lack of activity of Catalyst IV when compared to the activity of Catalyst II as demonstrated in Examples 6–9 shows that the activity of zinc fluoride is totally unexpected.

CATALYST IV

| Example No. | 15 | 16 |
|---|---|---|
| Run No. | 28F | 29F |
| Temperature °C. | 400 | 400 |
| Contact Time, Sec. | 3.5 | 3.5 |
| Catalyst Wt. g. | 156 | 156 |
| HCBD, Mole/Hr. | 0.055 | 0.055 |
| HF, Mole/Hr. | 0.55 | 0.55 |
| Duration of Run, Hr. | 3.5 | 3.5 |
| Conversion, % | 9.6 | 6.4 |
| Yield of Cyclic Prod., % | 21.9 | 21.9 |
| Products Obtained Cyclic Prod. Mole % | 2.1 | 1.4 |
| $CF_2$—$CF_2$—$CCL$=$CCL$ | | |
| $CF_2$—$CFCL$—$CCL$=$CCL$ | | |
| $CF_2$—$CF_2$—$CF$=$CCL$ | 2.1 | 1.4 |
| $CF_2$—$CF_2$—$CF$=$CF$ | | |
| Recycleable Products, Mole % | 94.6 | 97.3 |
| $CF_2$=$CCL$—$CCL$=$CCL_2$ | 1.6 | 1.5 |
| $CFCL$=$CCL$—$CCL$=$CCL_2$ | 2.6 | 2.2 |
| $CCL_2$=$CCL$—$CCL$=$CCL_2$ | 90.4 | 93.6 |
| Non-Recycleable Prod., Mole % | 3.3 | 1.4 |
| $CF_3$—$CH$=$CF$—$CF_3$ | | |
| $CF_3$—$CH$=$CCL$—$CF_3$ | | |
| $CF_3$—$CCL$=$CCL$—$CF_3$ | | |
| $CF_3$—$CH$=$CH$—$CF_3$ | | |
| $CF_3$—$CHF$—$CH_2$—$CF_3$ | | |
| $CH_2CL$—$CH_2$—$CH_2$—$CH_3$ | | |
| Others | 3.3 | 1.4 |

EXAMPLES 17–19

Results of fluorination-cyclization of hexachlorobutadiene using Catalyst V which is not a catalyst of this invention are tabulated below. The reactions were carried out as described in Examples 2–5 above. With Catalyst V hexachlorobutadiene conversion of about 33 percent and the yield of cyclic compounds of about 50 percent were obtained. Comparison of the activity of Catalyst V with that of Catalyst III as shown in Examples 10–14 again demonstrates the unexpected efficacy of Catalyst III even though both metals are in the same Group IIB of the periodic table.

CATALYST V

| Example No. | 17 | 18 | 19 |
|---|---|---|---|
| Run No. | 30F | 31F | 32F |
| Temperature °C. | 400 | 400 | 400 |
| Contact Time, Sec. | 5.6 | 5.6 | 5.6 |
| Catalyst Wt. g. | 147 | 147 | 147 |
| HCBD, Mole/Hr. | 0.055 | 0.055 | 0.055 |
| HF, Mole/Hr. | 0.55 | 0.55 | 0.55 |
| Duration of Run, Hr. | 3.0 | 3.0 | 3.0 |
| Conversion, % | 31.6 | 32.6 | 33.2 |
| Yield of Cyclic Prod., % | 45.5 | 51.8 | 53.2 |
| Products Obtained | | | |
| Cyclic Prod. Mole % | 14.4 | 16.9 | 17.7 |
| $\underline{CF_2-CF_2-CCL=CCL}$ | 3.7 | 3.6 | 3.0 |
| $\underline{CF_2-CFCL-CCL=CCL}$ | 10.5 | 13.2 | 14.7 |
| $\underline{CF_2-CF_2-CF=CCL}$ | 0.2 | 0.1 | |
| $\underline{CF_2-CF_2-CF=CF}$ | | | |
| Recycleable Prod., Mole % | 84.2 | 81.5 | 81.3 |
| $CF_2=CCL-CCL=CCL_2$ | 2.7 | 2.5 | 3.2 |
| $CFCL=CCL-CCL=CCL_2$ | 13.1 | 11.6 | 11.3 |
| $CCL_2=CCL-CCL=CCL_2$ | 68.4 | 67.4 | 66.8 |
| Non-Recycleable Prod. Mole % | 1.4 | 1.5 | 1.5 |
| $CF_3-CH=CF-CF_3$ | | | |
| $CF_3-CH=CCL-CF_3$ | | | |
| $CF_3-CCL=CCL-CF_3$ | | | |
| $CF_3-CH=CH-CF_3$ | | | |
| $CF_3-CHF-CH_2-CH_3$ | | | |
| $CH_2CL-CH_2-CH_2-CH_3$ | 0.2 | 0.3 | 0.3 |
| Others | 1.2 | 1.2 | 1.2 |

EXAMPLES 20–22

Results of fluorination-cyclization of hexachlorobutadiene using Catalyst VI which is not a catalyst of this invention are tabulated below. The reactions were carried out as described in Examples 2–5 above. While the yields of cyclic products obtained, based on the conversion of hexachlorobutadiene, were comparable to those obtained with Catalyst III, the conversions of hexachlorobutadiene were considerably lower which means that a greater amount of the material in the product stream must be recovered and recycled.

CATALYST VI

| Example No. | 20 | 21 | 22 |
|---|---|---|---|
| Run No. | 1F | 2F | 3F |
| Temperature °C. | 400 | 400 | 400 |
| Contact Time, Sec. | 10.1 | 10.1 | 10.1 |
| Catalyst Wt. g. | 123 | 123 | 123 |
| HCBD, Mole/Hr. | 0.065 | 0.065 | 0.065 |
| HF, Mole/Hr. | 0.60 | 0.60 | 0.60 |
| Duration of Run, Hr. | 4.3 | 2.5 | 4.0 |
| Conversion, % | 70.3 | 71.7 | 67.5 |
| Yield of Cyclic Products % | 55.4 | 83.2 | 82.2 |
| Products Obtained | | | |
| Cyclic Products Mole % | 39.0 | 59.7 | 55.5 |
| $\underline{CF_2-CF_2-CCL=CCL}$ | 25.3 | 39.5 | 21.9 |
| $\underline{CF_2-CFCL-CCL=CCL}$ | 1.5 | 5.6 | 1.3 |
| $\underline{CF_2-CF_2-CF=CCL}$ | 0.4 | 1.8 | |
| $\underline{CF_2-CF_2-CF=CF}$ | 11.8 | 12.8 | 32.3 |
| Recycleable Products Mole % | 45.6 | 32.0 | 36.0 |
| $CF_2=CCL-CCL=CCL_2$ | 8.8 | 1.3 | 0.3 |
| $CFCL=CCL-CCL=CCL_2$ | 7.1 | 2.4 | 3.2 |
| $CCL_2=CCL-CCL=CCL_2$ | 29.7 | 28.3 | 32.5 |
| Non-Recycleable Prod. Mole % | 15.4 | 8.3 | 8.5 |
| $CF_3-CH=CF-CF_3$ | 0.1 | 1.5 | 0.5 |
| $CF_3-CH=CCL-CF_3$ | 12.3 | 4.6 | 5.7 |
| $CF_3-CCL=CCL-CF_3$ | 2.6 | 0.6 | 0.1 |
| $CF_3-CH=CH-CF_3$ | | | |
| $CF_3-CHF-CH_2-CF_3$ | | | |
| $CH_2CL-CH_2-CH_2-CH_3$ | | | |
| Others | 0.3 | 1.6 | 2.2 |

EXAMPLES 23–25

Results of fluorination-cyclization of hexachlorobutadiene using Catalyst VII which is not a catalyst of this invention are tabulated below. The reactions were carried out as described in Examples 2–5 above with the exception that a reactor which was 150 cm. (60 inches) was used. These examples show that while Catalyst VII has moderate activity as fluorination cyclization catalyst, its activity is not long-lasting. The maximum activity was found after about 2 hours (Example 24), and thereafter both the conversion and the yield rapidly decreased.

CATALYST VII

| Example No. | 23 | 24 | 25 |
|---|---|---|---|
| Run No. | 400 | 400 | 400 |
| Temperature °C. | 400 | 400 | 400 |
| Contact Time, Sec. | 10 | 10 | 10 |
| Catalyst Wt. g. | 523 | 523 | 523 |
| HCBD, Mole/Hr. | 0.096 | 0.096 | 0.096 |
| HF, Mole/Hr. | 2.404 | 2.404 | 2.404 |
| Duration of Run, Hr. | 1 | 2 | 4 |
| Conversion, % | 63.1 | 79.6 | 51.9 |
| Yield of Cyclic Prod., % | 38.0 | 52.4 | 40.2 |
| Products Obtained | | | |
| Cyclic Prod. Mole % | 24.0 | 41.7 | 20.9 |
| $\underline{CF_2-CF_2-CCL=CCL}$ | 5.4 | 24.3 | 7.6 |
| $\underline{CF_2-CFCL-CCL=CCL}$ | 18.6 | 17.4 | 13.3 |
| $\underline{CF_2-CF_2-CF=CCL}$ | | | |
| $\underline{CF_2-CF_2-CF=CF}$ | | | |
| Recycleable Products, Mole % | 52.0 | 48.8 | 76.3 |
| $CF_2=CCL-CCL=CCL_2$ | 22.1 | 20.3 | 18.6 |
| $CFCL=CCL-CCL=CCL_2$ | 13.0 | 8.1 | 9.6 |
| $CCL_2=CCL-CCL=CCL_2$ | 36.9 | 20.4 | 48.1 |
| Non-Recycleable Prod. Mole % | 4.0 | 9.5 | 2.8 |

The polyfluoroperhalocyclobutenes produced in the process of this invention are useful as solvents, heat transfer medium, dielectric fluids and as intermediates. For example 1,2-dichloro-3,3,4,4-tetrafluorocyclobutene and hexafluorocyclobutene obtained by this process may be oxidized with potassium permanganate as described in J. Am.Chem. Soc., 69 281-3 (1947) to form perfluorosuccinic acid. Perfluorosuccinic acid is a useful intermediate in the preparation of synthetic resins and fibers (Ind.Eng.Chem. 39 415 (1947)). The polyfluoroperhalocyclobutenes are also readily chlorinated or brominated to form polyfluoroperhalocyclobutanes which are useful as heat transfer liquids in refrigeration systems and as solvents as described in U.S. Pat. No. 2,404,374 — Re. 23,425.

The foregoing detailed description has been given for clarity of understanding only and no unnecessary limitations are to be understood therefrom. The invention is not limited to the exact details shown and described for obvious modifications will occur to one skilled in the art.

The embodiments of the invention in which an exclusive property or privilege is claimed are defined as follows:

1. In the process for preparing polyfluoroperhalocyclobutenes by reacting hexachlorobutadiene with hydrogen fluoride in the presence of a catalyst the improvement which comprises conducting the reaction at a temperature of from about 300° C. to about 500° C. and at a contact time of from about 3.5 to about 21 seconds, in the presence of a catalyst selected from zinc fluoride mixed with graphite and zinc fluoride on alumina, with the proviso that when the zinc fluoride on alumina catalyst is employed it is prepared by contacting zinc chloride on alumina with hydrogen fluoride.

2. An improved process according to claim 1 wherein an excess of hydrogen fluoride is employed in reacting the hexachlorobutadiene with hydrogen fluoride.

3. An improved process according to claim 1 wherein from about 10 to 12 moles of hydrogen fluoride per mole of hexachlorobutadiene are employed in reacting the hexachlorobutadiene with hydrogen fluoride.

4. An improved process according to claim 1 wherein the contact time is from about 5 to about 15 seconds.

5. An improved process according to claim 4 wherein the contact time is from about 8 to about 12 seconds.

6. An improved process according to claim 5 wherein the reaction of hexachlorobutadiene and hydrogen fluoride takes place at a temperature of from about 375° C. to about 425° C. and in the presence of a zinc fluoride on alumina catalyst.

* * * * *